United States Patent [19]

Galcik et al.

[11] 3,764,920

[45] Oct. 9, 1973

[54] APPARATUS FOR SAMPLING AN ASYNCHRONOUS SIGNAL BY A SYNCHRONOUS SIGNAL

[75] Inventors: Anthony J. Galcik; Ronald E. Lange, both of Phoenix, Ariz.

[73] Assignee: Honeywell Information Systems Inc., Waltham, Mass.

[22] Filed: June 15, 1972

[21] Appl. No.: 263,066

[52] U.S. Cl. ................. 328/110, 307/208, 307/218, 307/232, 328/92, 328/94

[51] Int. Cl. ............................................. H03k 5/20

[58] Field of Search .................... 307/208, 215, 218, 307/232; 328/63, 72, 92, 94, 109, 110

[56] References Cited

UNITED STATES PATENTS

| | | | |
|---|---|---|---|
| 3,225,301 | 12/1965 | McCann | 307/208 X |
| 3,091,737 | 5/1963 | Tellerman et al. | 307/208 X |
| 3,114,109 | 12/1963 | Melas | 307/208 X |
| 3,631,269 | 12/1971 | Monahan | 307/208 X |

*Primary Examiner*—Stanley D. Miller, Jr.
*Attorney*—James A. Pershon et al.

[57] ABSTRACT

The asynchronous signal is complemented and directed to a latching logic circuit as the data input and the synchronous signal are directed to the clock input of the latching circuit. The latching circuit has built-in delays to reliably latch if the low or active portion of the asynchronous pulse occurs during the "window" or high portion of the synchronous signal. The latching circuit also includes a jamming circuit connected to its clock input whereby a low or disabled window time of the synchronous signal prevents a change in state by the latching circuit. A pulse delay circuit generates a sampling pulse a period of time after the window time to sample the output of the latching circuit.

5 Claims, 4 Drawing Figures

APPARATUS FOR SAMPLING AN ASYNCHRONOUS SIGNAL BY A SYNCHRONOUS SIGNAL

BACKGROUND OF THE INVENTION

This invention relates generally to a bistable multivibrator electron space discharge devise system and more particularly to a particular logic circuit comprising the bistable or latching circuit with particular signal pulses to sample an asynchronous signal with a synchronous signal.

In many present-day data processing systems, signals within each particular component of the system generally operate in synchronism with each other signal within the component. This synchronism however is not carried on between each component. Thus when a signal is transmitted from one component to the other, the receiving component accepts the incoming signal as an asynchronous signal, that is, not in synchronism with the rest of its internal pulses. Sampling periods and sampling signals are set up in the receiving component to check for the occurrence of an incoming asynchronous signal. The sampling is performed to prevent the asynchronous signal from affecting the receiving component at an improper time.

In prior art logic circuits used to time asynchronous signals, the asynchronous signals would be logically "ANDed" to the synchronous signal. The output signal would then be directed to a bistable device. The output of the bistable device would then be sampled by a sampling signal thereby synchronizing the occurrence of an asynchronous signal to the other signals occurring in the data processing system. Since the asynchronous signal can occur at any time with respect to the synchronous signals of the system, narrow incomplete pulses called glitches can occur if the asynchronous signal is ending as the sampling period is starting or if the asynchronous signal is starting as the sampling period is ending. These glitches cause a normal bistable device to oscillate and the outcome of the latch becomes uncertain for a lengthy period of time. Formerly this uncertain period of time was calculated by an attempt to determine worse case condition. A pulse delay circuit of this calculated period of time was then placed into the system to generate the sampling pulse. The extreme length of time that the sampling pulse had to be delayed caused a slowing of the data processing functions.

Apparatus is needed to provide a method of sampling an asynchronous signal with a specific synchronous signal to produce an output signal free from oscillations and improper pulses.

SUMMARY OF THE INVENTION

The problems of the prior art are solved by providing a latching logic circuit that positively prevents the output signal from changing state during a nonsampling period of time. Inherent circuit delays in a feedback latching circuit within the latching circuit and the use of a synchronous signal as the clocking signal for the latching circuit permits a reliable output signal for one state if the asynchronous signal occurred within the sampling period and the opposite state if the asynchronous signal occurred during the nonsampling period.

A synchronous signal, positive during the sampling or "window" period of the pulse and negative during the nonsampling period, is directed to a clock input lead of a latching device. An asynchronous signal, positive during the inactive portion of the signal and negative during the active period of time, is applied to a data signal input to the latching device.

The latching device includes a jamming circuit and a feedback latching circuit. The jamming circuit is connected to the clock input to prevent or "jam" a change in state by the latching device during the nonsampling period. The feedback latching circuit includes a built-in circuit delay time to give the jamming circuit sufficient time to overrule a latch on a close or insufficient overlap time between the window of the synchronous pulse and the active period of the asynchronous signal.

The normal usage for a latching circuit of this type is with a positive clock and either negative or positive data input. The width of the nonsampling period or negative data input to the latching circuit must envelop the sampling pulse to prevent a pulse sampling and at the same time must be of sufficient pulse width to allow for the recognition of the correct asynchronous signal through the delay time of the latching circuit and its drive elements prior to the time of occurrence of a sampling pulse. The nonsampling period pulse must latch the output of the latching circuit to prevent any change in the output of the circuit both if a correct sampling of the asynchronous signal has occurred and if the asynchronous signal occurred too late to be sampled.

The normal operation of the latching device in sampling asynchronous signals is to connect the synchronous signal to the data input and the asynchronous signal to the clock input of the latching device. A positive, that is, a high or enabling signal on both data and clock inputs sets the latching device and the output is then sampled after a delay period. This method does not take advantage of the jamming circuit.

It is, therefore, an object of the present invention to provide an enhanced logic circuit for reliably sampling an asynchronous signal by a synchronous signal.

It is another object of the present invention to provide a latching circuit which reliably samples an asynchronous signal by a synchronous signal by complementing the asynchronous signal.

It is yet another object to provide a logic circuit that combines the gating and latching of an asynchronous signal to a synchronous signal with positive output results.

It is a further object to provide a reliably operated latching circuit that samples asynchronous signals by synchronous signals by the use of the synchronous sampling signal as a clock input and a complemented asynchronous signal as a data input.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

DESCRIPTION OF THE PREFERRED EMBODIMENT

Figure 1:
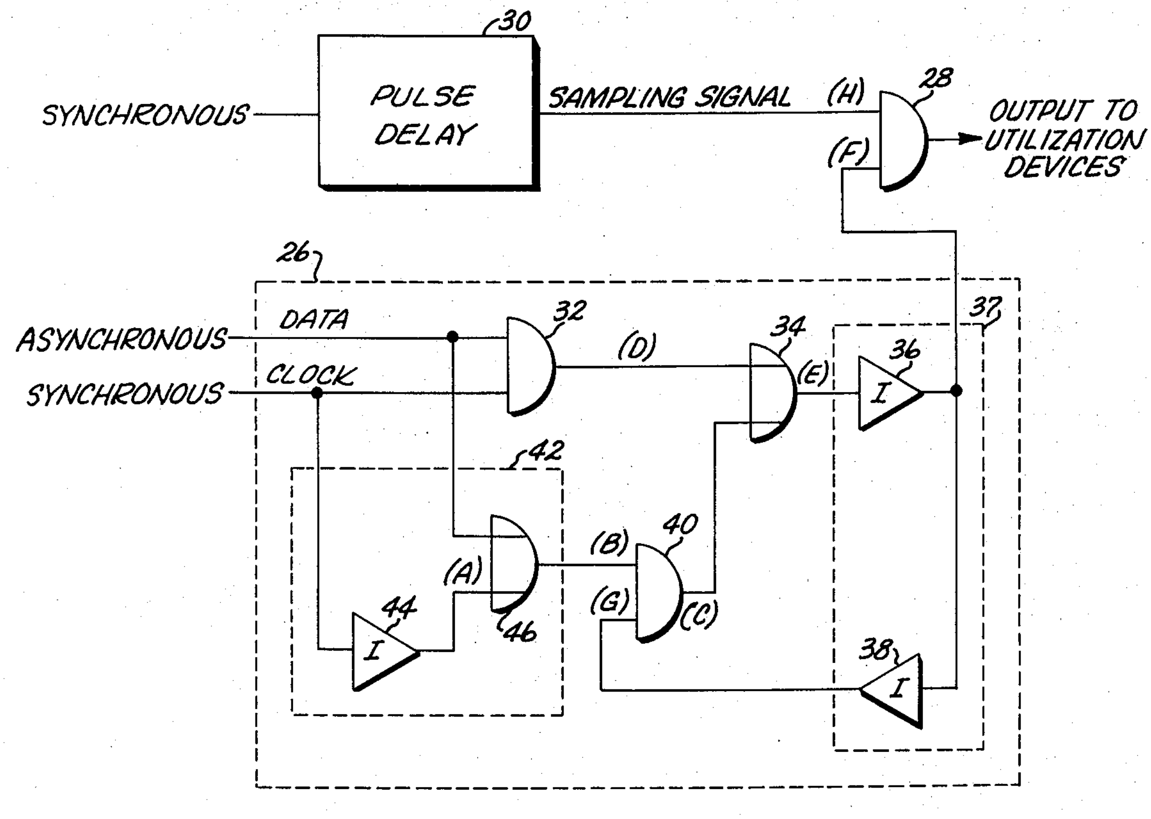
FIG. 1 is a logic diagram showing a latching circuit and associated logic circuits for accomplishing the sampling of a complemented asynchronous signal by a synchronous signal.
Figure 2:
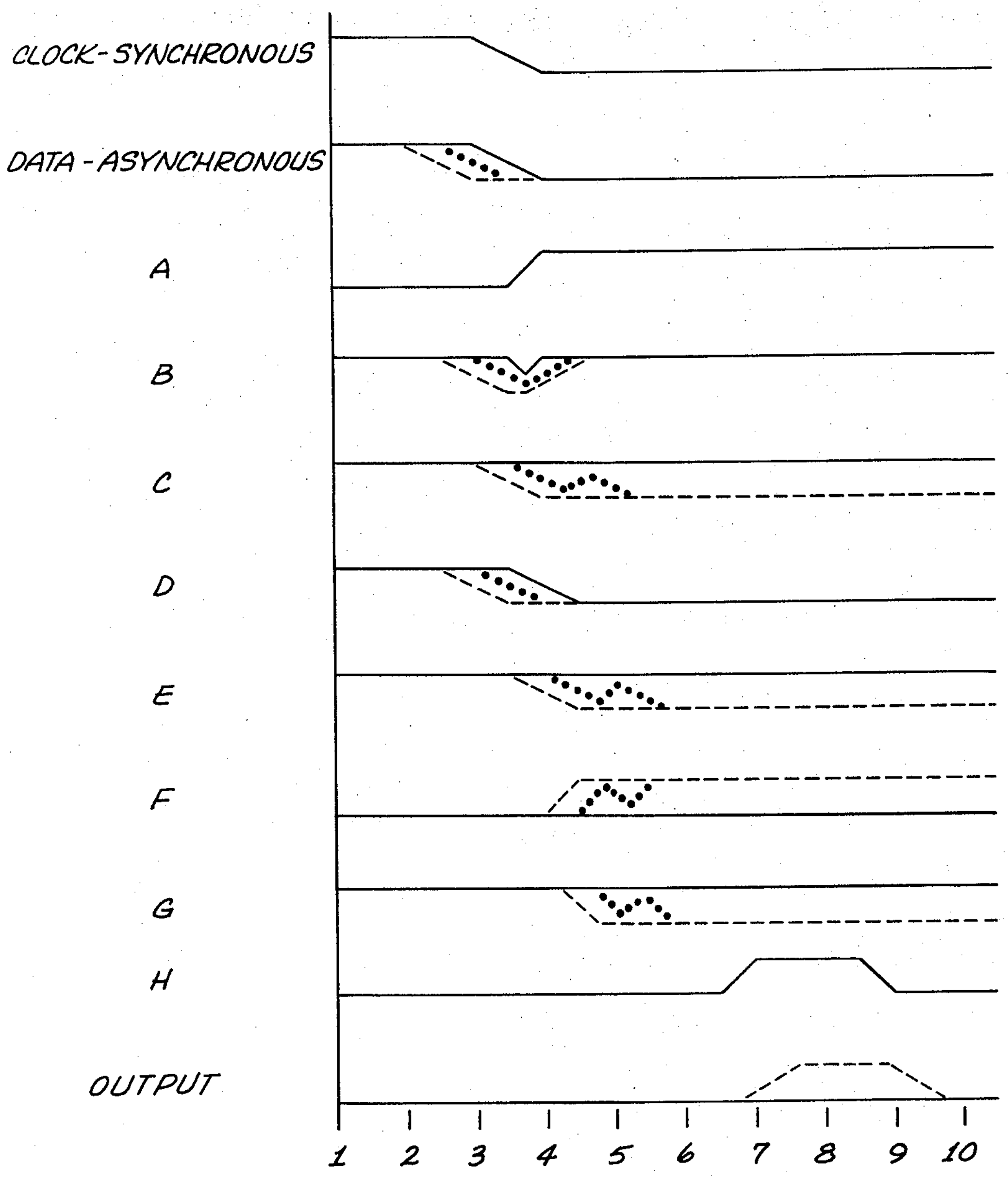
FIG. 2 is a timing diagram of the resultant signals in the operation of the embodiment shown in FIG. 1 and described herein.
Figure 3:
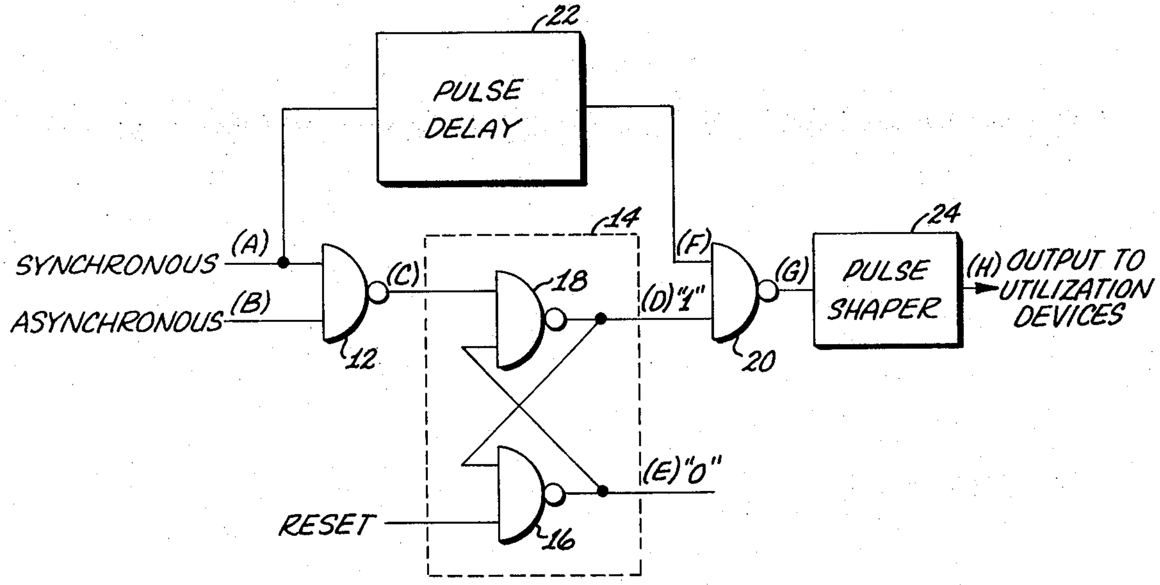
PRIOR ART FIG. 3
FIG. 3 is a logic diagram of a prior art circuit.

The description of the signals and circuitry according to the present invention, as shown in FIGS. 1 and 2, will proceed after a discussion of the prior art and the inherent problems therein. To overcome some of the basic problems inherent in sampling an asynchronous signal, bistable devices such as flip-flops are generally used. Bistable devices, however, when triggered with narrower than normal width clock pulses such as is possible when an asynchronous signal is sampled by a synchronous signal, are subject to being triggered into a decaying circulating pulse mode with the result that many times the normal delay time will be required before the device finally settles into one of the two stable states. Such a use of a bistable device is shown in FIG. 3. A typical timing of the signals of the prior art circuitry is shown in FIG. 4.

As used in this specification, a reference to a high or enabling signal refers to a signal that causes a circuit to conduct. A low or disabling signal refers to a signal that causes a circuit to stop or prevent conduction. Thus two high or enabled signals applied to a two input AND-gate causes the output of the AND-gate to be high or enabled.

Referring to the prior art as shown in FIG. 3, the synchronous or sampling signal and the asynchronous signal are directed to a NAND-gate 12. The output of the NAND-gate 12 is directed to a flip-flop 14 shown as a cross-coupled pair of NAND-gates 16 and 18. The 1 or enabled output of the flip-flop 14 is directed to one leg of another NAND-gate 20. A second input of the NAND-gate 20 is controlled by a pulse delay circuit 22. The pulse delay circuit 22 is triggered by the synchronous signal and performs the function of enabling one leg of the NAND-gate 20 after a period of time. This pulse delay period of time is necessary in order to sample the asynchronous signal after a period of time necessary to take care of any circuit delay time such as occasioned by the NAND-gate 12 and the flip-flop circuitry 14. The output of the NAND-gate 20 is directed to a pulse shaper 24 to form the pulse into the correct shape for transmission from its output to the utilization devices.

Figure 4:
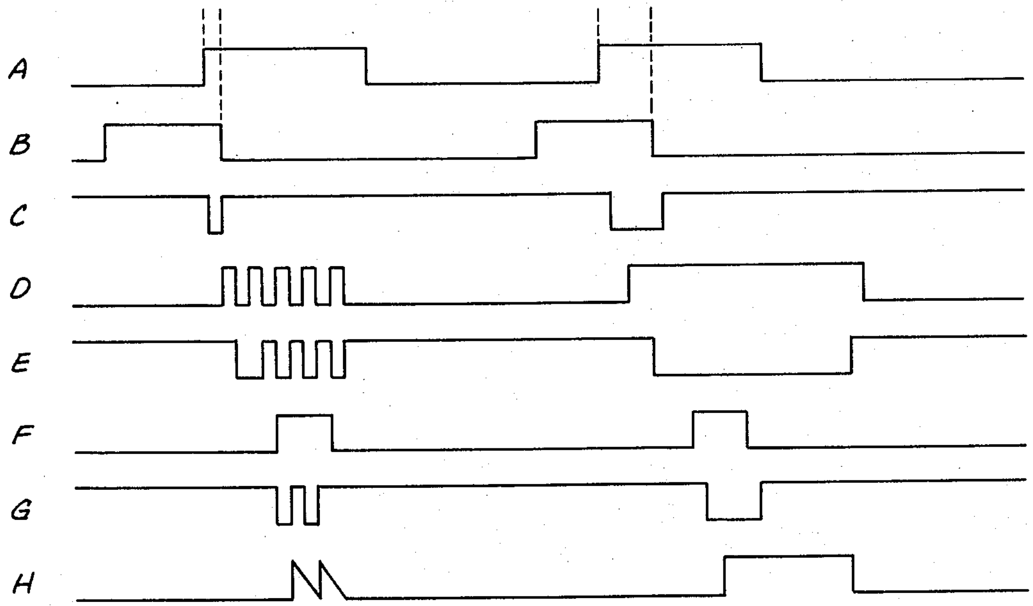
PRIOR ART FIG. 4
FIG. 4A–H are timing diagrams of the resultant signals in the operation of a prior art circuit shown in FIG. 3.

For the operation of the prior art circuitry according to FIG. 3, reference is made to the timing chart of FIG. 4. The lettered signals as shown in FIG. 4 are referenced to the letters placed in parenthesis on the inputs and outputs on the logic circuitry shown in FIG. 3. Thus the A waveform timing shown in FIG. 4 refers to the synchronous signal directed to one leg of the NAND-gate 12 and the pulse delay 22. The signals shown in FIG. 2 are shown in relative timing between each of the signals. Two sampling cycles are shown, the first being an error condition and the second a correct operational cycle. The B signal timing cycle refers to the asynchronous signal of FIG. 3. The other timing signals C through H refer to various signals appearing through the prior art circuitry of FIG. 3.

Still referring to FIG. 3 and especially to FIG. 4, if the overlap between the synchronous signal, signal A, and the asynchronous signal, signal B, is too small, signal C will go from a high or enabled state to a low or disabled state for too short a period to cause the flip-flop 14 to set to one state. Therefore, as shown in signals D and E, the flip-flop 14 will oscillate and be unstable. The final state of the flip-flop 14 is completely indeterminate. The delayed sampling signal F can sample during the oscillations and therefore the signal G at the output of the NAND-gate 20 will also be an oscillating pulse. With an oscillating pulse the pulse shaper output signal H will be a saw-tooth waveform completely unusable in the utilization devices such as further logic gates or flip-flops.

The second synchronous signal shown in FIG. 4 shows a larger overlap between the synchronous signal A and the asynchronous signal B. For this condition the output of the NAND-gate 12, signal C, will go from a high to a low state for a somewhat longer period of time. This period of time gives the flip-flop 14 sufficient time to set to one state such as to a 1 state shown by the signal D going from a low or disabled state to a high or enabled state. Thus when the delayed sampling signal F occurs, the 1 output signal D from the flip-flop 14 will be in a steady enabled state. A steady signal will be directed from the NAND-gate 20 to the pulse shaper 24 and the pulse shaper signal output H will be a complete signal for transmission to the utilization devices.

For the usual type of flip-flop as shown in the prior art, the signal actuating the flip-flop must be on the order of six nanoseconds or greater in order for the cross-coupled gate flip-flops to set to the required state without oscillating and without an abnormally lengthy settling time because of the oscillations. It is desired that the flip-flop, no matter what the type, if only partially triggered, either latch in a changed state or settle back into the original state with a minimum of hesitation. Since the asynchronous signal can appear at any relative time with respect to the sampling signal, the oscillation and the uncertainty can and does occur resulting in an unstable state completely unacceptable in data processing systems. For this reason a latching circuit such as that shown in FIG. 1 is utilized.

The normal operation of a latchig circuit to sample an asynchronous signal by a synchronous signal is to use both signals as positive enabling signals. The usual pattern is also to use the asynchronous signal as the clocking signal. With this type of operation, however, the latching circuit has similar problems to any other flip-flop. The latch is to be enabled whenever the asynchronous or clock signal is high or enabled at the same time the synchronous or data signal is high. There is no problem if the asynchronous signal appears anywhere near the beginning of the synchronous signal because the latching circuit will settle into one state either enabled or not before its output is sampled. This is true even though the asynchronous signal appears too early and is going from a high to a low state while the synchronous sampling signal is going from a low to a high or enabled state. The latch might oscillate or take a long time to settle under these conditions but the length of time before the output of the latch is sampled is sufficient to permit a steady state, either enabled or not, depending upon the length of overlap of the asynchronous signal with the synchronous sampling signal and the speed of the circuitry in the latching circuit. The biggest problem occurs when the asynchronous signal appears at the end of the synchronous sample signal. At this time there is only a short time remaining before the sampling pulse occurs to sample the output of the latching circuit. It is at this time that the particular method of applying the asynchronous signal and the synchronous sampling signal to the latching circuit along with the particular use of the type of latching circuit according to the present invention discloses the advantages of the present invention.

Referring now to FIG. 1 for the discussion of the embodiment according to the present invention, the complemented asynchronous signal is shown directed to the data input of a latching circuit 26 and the synchronous signal is shown directed to the clock input. The latching circuit 26, preferably usable according to the present invention in that a low or disabled signal applied to the clock clamps the output to a low or disabled signal, is shown with an output directed to a sampling AND-gate 28. A second leg of the sampling AND-gate 28 is controlled by a pulse delay circuit 30. The pulse delay circuit 30 is actuated by the synchronous signal and provides a synchronous sampling pulse to sample the output of the latch circuit 26 via the AND-gate 28. Thus the synchronous signal provides a window during which the asynchronous signal must occur and then samples the output of the latch circuit 26 at a later time for use in the utilization devices. The sampling is performed in the AND-gate 28.

The latching circuit 26 shown in FIG. 1 comprises an AND-gate 32 on the input connected to the data and clock inputs of the latching circuit 26. The output of the input AND-gate 32 is directed to one leg of an OR-gate 34. The output of the OR-gate 34 is directed to a delaying inverter 36 whose output is the output from the latching circuit 26. The output of the delaying inverter 36 is also directed to another delaying inverter 38, both forming a part of a feedback latching circuit 37. The output of the second delaying inverter 38 is directed to an AND-gate 40. The clock input to the latch circuit 26 is directed to a jamming circuit 42 comprising a third inverter 44 whose output is directed to one leg of an OR-gate 46. The data input to the latch circuit 26 is also directed to one leg of the OR-gate 46. The output of the OR-gate 46 and thus the jamming circuit 42 is directed to a second leg of the AND-gate 40.

In FIG. 2 a timing chart is shown with the relative timing of selected signals internal and external to the latch circuit 26. The solid lines on each of the signals are for a condition under which the synchronous signal directed to the clock input of the latch circuit 26 and the asynchronous signal directed to the data input both arrive at the same time. This is approximately at the latest time that a positive latch-out will occur. In other words at this timing the disabled or negative synchronous signal will prevent or latch-out any change in the output caused by the appearance of an asynchronous signal at a time too late to be sampled by the sampling signal. A dashed line signal timing is shown on FIG. 2 and represents the approximate timing at which the latest asynchronous signal can appear and positively latch the latch circuit 26 to an enabled or high position to cause a correct sampling of the asynchronous pulse by the sampling signal. A third timing is shown in a dotted line to show a portion of the unstable conditions and the resultant internal signals which overcome any instability.

Referring now to FIGS. 1 and 2 for an operation of the latch circuit 26 using a positive synchronous signal as the window during which the asynchronous signal must occur in order for a correct sampling of the complemented asynchronous signal and taken in the area where the sampling problems occur. The asynchronous signal is inverted or complemented prior to connection to the data input of the latch circuit 26 and thus a low asynchronous signal must result in a high or enabled signal from the latch circuit 26, the low asynchronous signal appearing during the window time of the synchronous signal. Different timing positions are marked as 1 through 10 on the timing chart of FIG. 2. Each timing position indicates approximately five nanoseconds.

Referring to the solid line of the timing chart of FIG. 2, that is, the asynchronous signal going low or activated at the same time that the synchronous signal is going low or inactivated, at position 1 the synchronous signal and the asynchronous signal are both high. Signal A depicting the output signal of the inverter 44 is low because the synchronous signal connected to the jamming circuit 42 is high. Signal B, the output signal of the OR-gate 46, is in a high state because the asynchronous signal directed to one leg of the OR-gate 46 is high. Signal D is in a high or enabled condition because both signal inputs to the AND-gate 32 are in a high state. Since signal D is high and is directed to an input leg of the OR-gate 34, signal E will be in a high or enabled position. Signal E is directed to the first delaying inverter 36 of the feedback latching circuit 37. Signal F which is the output of the inverter 38 and the output of the latching circuit will therefore be in a low or disabled condition.

Signal F is directed to the input of the second delaying inverter 38 of the feedback latching circuit 37. The output of the second inverter 38, signal G, is therefore in a high state because signal F directed to the input of the inverter 38 is in a low state. At this time, since both signals B and G are high and both signals are directed to the AND-gate 40, signal C is in a high state.

Between points 3 and 4 on FIG. 4 and continuing with the solid lines, both the synchronous and the asynchronous signals are shown going from a high to a low state. Since the synchronous signal is going to a low state, signal A will go from a low to a high state since signal A is taken after the jamming inverter 44. Signal A will go to a high state after a circuit delay time but will reach a high state in a relatively short amount of time because of the switching action of an inverter. Also between 3 and 4 timing, signal B will start to go from a high to a low state because the asynchronous signal directed to the input of the OR-gate 42 is going from a high to a low state. At the same time, however, signal A is going from a low to a high state which will force signal B to return to a high state. Therefore a small dip or glitch in signal B is shown. Signal D taken from the output of the AND-gate 32 will go from a high to a low state after a time delay because the data or asynchronous signal at the input to the AND-gate 32 is going to a low state. This time delay results from the normal circuit delay. Signal E at the output of the OR-gate 34 will, after a circuit time delay, start to go from a high to a low state as shown in FIG. 2. However, at this time, four nanoseconds later as shown on the timing chart, signal F is still low making signal G high. Since both signal B and signal G are in a high state, signal C will remain in a high state carrying signal E into a high state via the OR-gate 34. The circuit delay caused by the two inverters 36 and 38 of the feedback latching circuit 37 along with the jamming of the input to the AND-gate 40 by the synchronous signal via the inverter 44 and the OR-gate 46 of the jamming circuit 42 prevent a change in the state of the output of the latching circuit 26.

The latch circuit 26 is therefore not allowed to change state and effectively it will appear as though the asynchronous signal did not change state. In fact the asynchronous signal has not become active at a correct time and, according to the synchronous signal, the asynchronous signal should have been and was ignored by the use of the latching circuit 26 and the polarity and application of the synchronous and asynchronous signals to the latching circuit 26.

Further with a second operation of the latch circuit 26 according to the present invention, between times 2 and 3 on the timing chart of FIG. 2 a dashed line is shown depicting that the asynchronous or data signal is going from a high or inactive to a low or active state during this time. All of the signals affected by this timing are shown in dashed lines. Signal A, being controlled by the synchronous signal, will be exactly the same as for the last operation. Signal B, however, will, after a circuit time delay, go from a high to a low state. Signal B will go to a low state because both inputs to the OR-gate 46 are essentially in a low state. Signal A is in a low state because the synchronous signal is still in a high state and the asynchronous signal is going from a high state to a low state. Signal D, at the output of the AND-gate 32, will also go from a high to a low state after a circuit delay caused by the AND-gate 32. Signal E will start to go from a high to a low state at this time as shown. However, again because of the circuit delay caused by the feedback latching circuit 37, signal E will remain high because both signal B and signal G are high causing signal C at the output of the AND-gate 40 to be high. Signal C, via the OR-gate 34, keeps signal E in a high state. However, when signal B goes from a high to a low state after a time delay, signal C will go from a high to a low state. Signal C going from a high to a low state will cause signal E to go from a high to a low state because both signal D and signal C applied to the inputs of the OR-gate 36 are either in a low state or going from a high to a low state. Therefore, between times 3 and 4 on the timing chart of FIG. 4, signal E will, after a time delay caused by the circuitry, go from a high to a low state.

Signal F at the output of the inverter 36 will go from a low to a high state. Signal G at the output of the second inverter 38 will go from a high to a low state. Thus the latch has changed state as a result of the asynchronous signal showing that the asynchronous signal appeared at a correct time within the window of the synchronous signal. Therefore, when the sampling signal, signal H, appears between times 7 and 10 of the timing chart, the output of the AND-gate 28 will go from a low to a high state as shown by the dashed lines.

A third condition, shown by the dotted lines in the timing chart of FIG. 4 will now be further explained. This time is chosen between the first and second operation to show the circuit signals during an unstable period of time. For the embodiment being described this unstable period of time is on the order of approximately 3 to 4 nanosecond. However, even during this unstable period the circuit delay and the latching ability of the circuit permits positive action and although it is not known whether the asynchronous signal will be recognized or not, the output will be in either state and will not be oscillating.

Still referring to FIGS. 1 and 2, the timing of the dotted lines shows that the asynchronous signal goes from a high to a low state midway between the first and second operation for this the third operation. Signal A will remain with the same timing because again the synchronous signal does not change the timing state. Signal B, after a circuit time delay, will go from a high to a low state as shown between timing 3 and 4. Signal B will go from a high to a low state because signal A is going from a low to a high state at a time close to time 4 and the asynchronous signal is going from a high to a low state at a 3 time. Signal C will start to go from a high to a low state after a circuit time delay because signal B at the input to the AND-gate 40 is going from a high to a low state. Signal D will go from a high to a low state, after a time delay caused by the AND-gate 32, as a result of the asynchronous signal going from a high to low state. Signal E at the output of the OR-gate 34 will start to go from a high to a low state between times 4 and 5 because both signal D and signal C are going from a high to a low state. Therefore, after a circuit time delay, signal E will start to go from a high to a low state causing signal F to go from a low to a high state and signal G to go from a high to a low state. However, right at the 4 time signal B at the output of the jamming circuit 42 returns from a low to a high state because signal A is going from a low to a high state. Thus between times 4 and 5 the circuit becomes unstable. Signal B going from a low to a high state will cause signal C to attempt to go from a low to a high state because at about time 5, signal G is starting to go from a high to a low state and therefore signal G will still be high when B returns from a low to a high state. Signal C will start to go from a low to a high state and, depending upon the circuit speed and the exact timing of the circuit, will either return to a high state or will continue to a low state to turn off the OR-gate 34 and cause signal E to change state. Or further, if signal E changes slightly, the output then depends upon whether the change is of sufficient amplitude to cause a change of state in the inverter 36. It is therefore possible during the times 5 and 6 to cause an instability but the latch circuit 26 will settle due to the positive action of the inverter 44 connected to the synchronous signal jamming the OR-gate 46 and one leg of the AND-gate 40 in a high state along with the time delay of the feedback latching circuit 37. The circuitry will become stable in a very short period of time because of the fast switching action of the delaying inverters 36 and 38 of the feedback latching circuit 37.

For the embodiment being described and the speed of the present-day integrated circuits, the time between the time periods 1 through 10 shown on FIG. 2 each depict approximately 5 nanosecond. Typical circuit delay time is on the order of 3 to 4 nanosecond. Thus the invention as disclosed describes the unique use of a positive latching circuit for the sampling of a random or asynchronous signal by a synchronous sampling signal. The invention as disclosed uses a synchronous signal as the input to the clock terminal of a latch circuit and uses an inverted or low state synchronous signal to trigger and set the latch circuit. The advantages of the particular adaptation have now been fully described and the appended claims are intended to cover and embrace this invention.

What is claimed is:

1. A system for sampling an asynchronous signal by a synchronous signal comprising:

a latching device having a data input terminal, a clock input terminal, and an output terminal;

the synchronous signal directed to the clock input terminal of the latching device and having its positive portion as a sampling window;

the asynchronous signal directed to the data input terminal of the latching circuit and having its negative portion as an actuation period;

said latching device including a jamming circuit connected to the clock and data input terminals for generating a jamming signal upon the inclusive occurrence of either or both positive asynchronous signals or negative synchronous signals, a feedback latching circuit for generating feedback latching signals and for generating output signals onto the output terminal, and logic circuitry means for emitting a first signal upon the concurrent occurrence of positive synchronous and asynchronous signals, a second signal upon the concurrent occurrence of positive feedback and jamming signals and a third signal upon the inclusive occurrence of either or both positive first signals or positive second signals;

said feedback latching circuit activated by said third signal to generate the output signal and to generate the feedback latching signal after a time delay;

a pluse delay circuit having its input terminal connected to the synchronous signal and actuated by a positive to negative excursion of the synchronous signal for providing a sampling signal on its output terminal after a period of time; and a logic gate having one input terminal connected to the output terminal of said pulse delay circuit and a second input terminal connected to the output terminal of said latching circuit to provide an output signal when the sampling signal occurs concurrently with the actuation of the latching circuit output by the positive synchronous signal and negative asynchronous signal.

2. A system according to claim 1 wherein said latching device includes:

a first AND-gate having an input connected to the data terminal and an input connected to the clock terminal;

a first OR-gate logic circuit having one input connected to the data terminal;

an inverter connected between the clock terminal and a second input of said first OR-gate;

a second AND-gate having its inputs connected to the output of said first OR-gate and to the delayed feedback latching signal;

a second OR-gate having its inputs connected to the outputs of said first and second AND-gates;

a second inverter connected between the output of said second OR-gate and the output terminal of the latching circuit; and a third inverter connected to the output terminal for generating the delayed feedback latching signal to the input to the second AND-gate.

3. A system according to claim 1 wherein the jamming circuit comprises:

a first OR-gate having one input connected to the data input terminal; and a first inverter having its input connected to the clock input terminal and its output connected to a second input of the first OR-gate.

4. A system according to claim 1 wherein the feedback latching circuit comprises:

a second and a third inverter connected in series; and a first AND-gate having one input connected to the output of the jamming circuit and a second input connected to the output of the third inverter;

wherein the input to the second inverter comprises the alternative of the concurrent occurrence of the positive asynchronous and synchronous signals, and the output of the first AND-gate.

5. A latching logic system comprising:

a latching circuit having a data and a clock input terminal and an output terminal;

an asynchronous signal directed to the data input terminal of the latching circuit;

a synchronous signal directed to the clock input terminal of the latching circuit;

said latching circuit being activated to change its state to generate an activated latch signal by the concurrent occurrence of the positive portion of the synchronous signal and a negative portion of the asynchronous signal;

a pulse delay circuit generating a sampling signal in response to said synchronous signal; and an output logic gate generating an output signal upon the concurrent occurrence of the sampling signal and the activated latch signal;

said latching circuit including;

a first AND-gate having its inputs connected to the data and clock terminals;

a first OR-gate logic circuit having one input connected to the data terminal;

an inverter connected between the clock terminal and a second input of said first OR-gate;

a second AND-gate having its inputs connected to the output of said first OR-gate and to the delayed feedback latching signal;

a second OR-gate having its inputs connected to the outputs of said first and second AND-gates;

a second inverter connected between the output of said second OR-gate and the output terminal of the latching circuit; and a third inverter connected to the output terminal for generating the delayed feedback latching signal to the input to the second AND-gate.

* * * * *